(12) United States Patent
Jejcic

(10) Patent No.: US 8,746,004 B2
(45) Date of Patent: Jun. 10, 2014

(54) MACHINE FOR PRODUCING ICE-CREAM

(75) Inventor: Valter Jejcic, Nova Gorica (SI)

(73) Assignee: Valmar Global VSE ZA Sladoled D.O.O., Volcja Draga (SI)

( * ) Notice: Subject to any disclaimer, the term of this patent is extended or adjusted under 35 U.S.C. 154(b) by 1027 days.

(21) Appl. No.: 12/685,116

(22) Filed: Jan. 11, 2010

(65) Prior Publication Data

US 2010/0175390 A1    Jul. 15, 2010

(30) Foreign Application Priority Data

Jan. 12, 2009    (IT) .............................. TO2009A0014

(51) Int. Cl.
  *A23G 9/04*    (2006.01)
  *A23G 9/00*    (2006.01)

(52) U.S. Cl.
  USPC ............................................. 62/342; 62/343

(58) Field of Classification Search
  USPC ......... 62/340, 354, 342, 343, 68; 47/174, 179
  See application file for complete search history.

(56) References Cited

U.S. PATENT DOCUMENTS

| | | | | |
|---|---|---|---|---|
| 3,654,770 A | * | 4/1972 | Clearman | 62/320 |
| 3,848,289 A | * | 11/1974 | Bachmann | 15/246.5 |
| 3,958,968 A | * | 5/1976 | Hosaka | 62/343 |
| 4,183,680 A | * | 1/1980 | Manfroni | 366/312 |
| 4,655,605 A | * | 4/1987 | Cipelletti | 366/312 |
| 5,636,889 A | * | 6/1997 | Bennett, Jr. | 294/82.23 |
| 5,857,351 A | * | 1/1999 | Angus et al. | 62/342 |
| 6,155,461 A | * | 12/2000 | Ishihara et al. | 222/146.6 |
| 6,923,010 B2 | * | 8/2005 | Small et al. | 62/68 |
| 7,878,021 B2 | * | 2/2011 | Perrier et al. | 62/342 |
| 8,262,005 B2 | * | 9/2012 | Garcia | 241/37.5 |
| 2002/0184910 A1 | * | 12/2002 | Hiramatsu | 62/354 |
| 2007/0243302 A1 | | 10/2007 | Jejcic | |
| 2009/0280214 A1 | * | 11/2009 | Kim et al. | 426/34 |

FOREIGN PATENT DOCUMENTS

CN    201015400 Y    2/2008

OTHER PUBLICATIONS

Plastics Institute of America Plastics engineering, manufacturing & data handbook. 2001 Norwell, Masschusetts Publisher: Kluwer Academic Publishers. p. 1689.*

* cited by examiner

*Primary Examiner* — Ljiljana Ciric
*Assistant Examiner* — Alexis Cox
(74) *Attorney, Agent, or Firm* — Robert P. Lenart, Esq.; Pietragallo Gordon Alfano Bosick & Raspanti, LLP

(57) ABSTRACT

A machine including: a housing; a cylindrical-shaped processing tub that extends into the housing; cooling means adapted to cool the processing tub; a mixing member rotatably mounted within the processing tub, with the mixing member being structured so as to mix ingredients in the processing tub and so as to scrape at least the inner side surface of the processing tub to prevent the ingredients from adhering to the side wall of the tub; and a containing collar which is dimensioned so as to be fitted in a releasable manner in the processing tub above the mixing member.

15 Claims, 4 Drawing Sheets

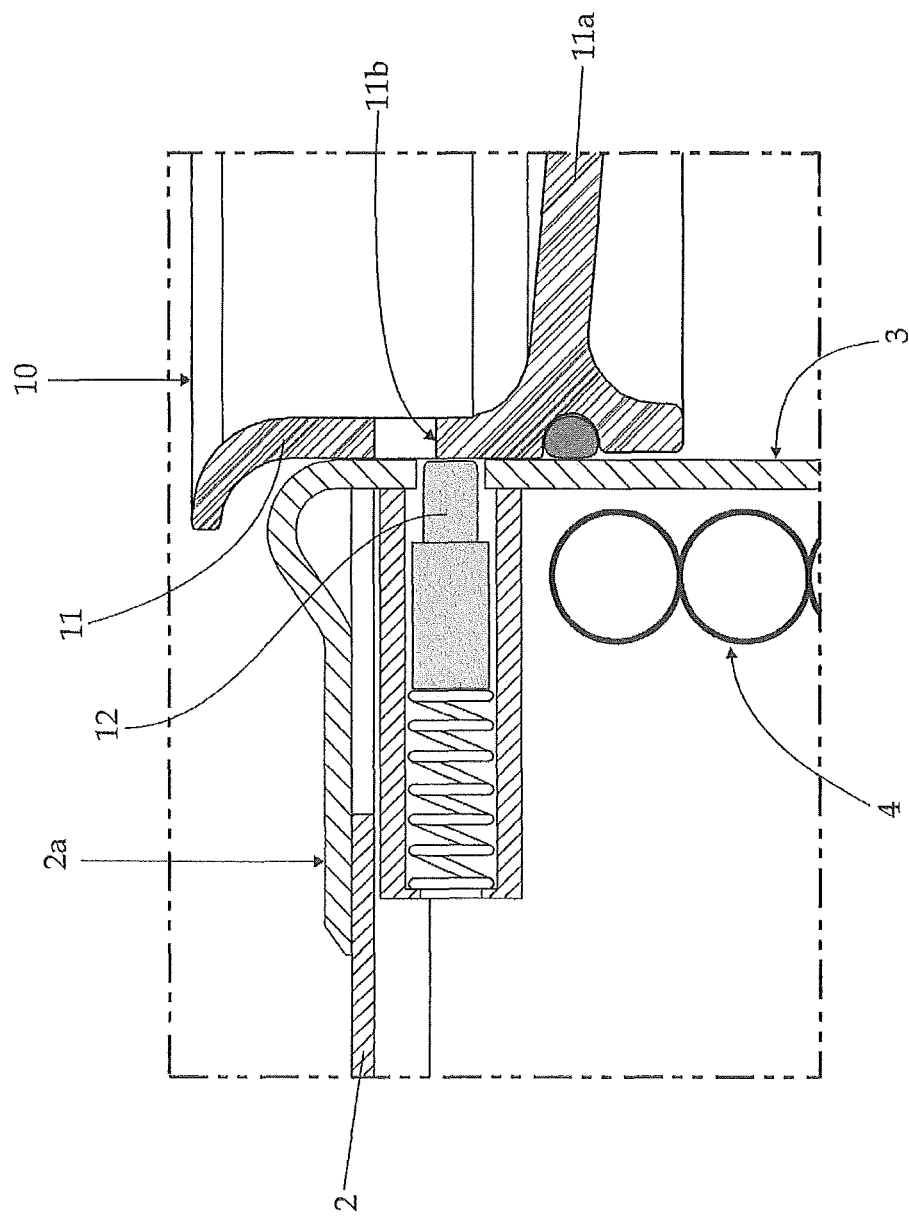

MACHINE FOR PRODUCING ICE-CREAM

CROSS-REFERENCE TO A RELATED APPLICATION

This application claims the benefit of Italian Patent Application No. TO2009A 000014 filed on Jan. 12, 2009, which is incorporated herein by reference.

FIELD OF THE INVENTION

The present invention relates to a machine for producing ice-cream and the like with a vertical-axis processing tub.

More in detail, the present invention relates to a batch freezer for producing ice-cream and the like with a vertical-axis processing tub, to which the following description refers purely by way of example without implying any loss of generality.

BACKGROUND OF THE INVENTION

As is known, batch freezers currently used for producing handmade ice-cream comprise a substantially parallelepiped-shape outer boxlike housing; a cylindrical-shaped processing tub extending into the boxlike housing, from the front face of the housing, while remaining coaxial to a substantially horizontal reference axis; and a porthole-shaped closing door, which is hinged onto the front face of the boxlike housing so as to be able to rotate about a vertical axis, and being positionable at closing of the inlet of the processing tub.

The presently known batch freezers further comprise an inner cooling circuit which is able to bring and hold the processing tub and its content at a temperature lower than 0° C.; a mixing member which is rotably mounted within the processing tub so as to be able to uniformly mix the various ingredients during the ice-cream creaming process; and finally an electric motor able to drive into rotation the mixing member within the processing tub.

The mixing member is further designed so as to be able to scrape the inner cylindrical surface of the processing tub, and possibly also the bottom of the same tub, so as to prevent, during the creaming process, the high viscosity mixture formed within the processing tub from stably adhering to the side wall and to the bottom of the tub, thus compromising the quality of the produced handmade ice-cream.

Obviously, the closing door of the batch freezer must be designed so as to fluid-tightly close the inlet of the processing tub, and to successfully retain the mixture within the processing tub during the final steps of the creaming process, when viscosity and consistency of the mixture reach particularly high values.

In order to meet this purpose, in nearly all the currently marketed batch freezers, the closing door consists of a substantially discoidal-shaped plate made of metal material, which is hinged onto the front face of the housing as a porthole, and at the lower part is provided with a draining opening with a guillotine-like fluid-tight shutter, through which the ice-cream comes out at the end of the creaming process. A hopper for loading the ingredients is further realized on the upper part of the metal plate, which hopper directly communicates with the inside of the processing tub so as to be able to pour the ingredients into the processing tub when the plate abuts on the inlet of the tub and closes the latter.

Unfortunately the weight of the closing door of the currently marketed batch freezers is so high to make economically unfeasible the production of a machine in which the processing tub is arranged in a vertical position, on the top of the boxlike housing. In fact, in this configuration the closing door should rotate about a horizontally oriented articulation axis, thus forcing the user to apply a considerable physical effort whenever he wants to open and close the door.

Furthermore, the machine safety standards would make it necessary to equip the batch freezer with a series of safety systems capable of preventing, during opening or closing, the door from violently falling on the user's fingers causing potentially very severe physical injuries. The safety systems would lead to a considerable increase in the production costs of the machine.

SUMMARY OF THE INVENTION

An aim of the present invention is therefore to provide a batch freezer for producing ice-cream and the like with a vertical-axis processing tub, which is free from above-described drawbacks and which is further cheap to produce.

In compliance with the above aim, according to the present invention there is provided a machine for producing ice-cream and the like, as claimed in the attached claims.

BRIEF DESCRIPTION OF THE DRAWINGS

A non-limiting embodiment of the present invention will now be described by way of example with reference to the accompanying drawings, in which:

FIG. 1 shows a perspective view, and with parts removed for clarity, of the upper part of a machine for producing ice-cream and the like, realized in accordance with the teachings of the present invention; whereas

FIG. 4 is an enlarged view of a portion of the machine of FIG. 2.

DETAILED DESCRIPTION OF THE INVENTION

Figure 1:
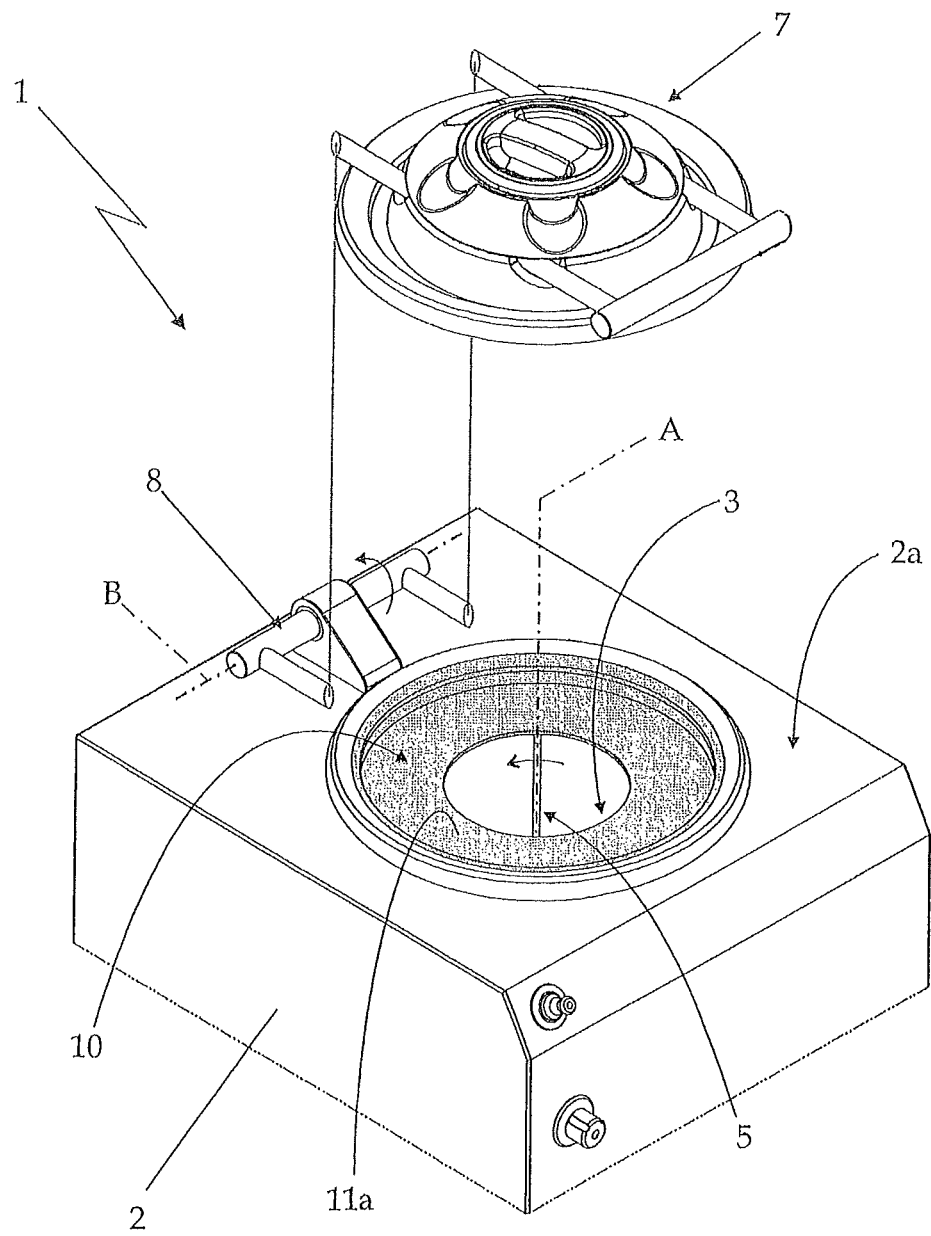
Figure 2:
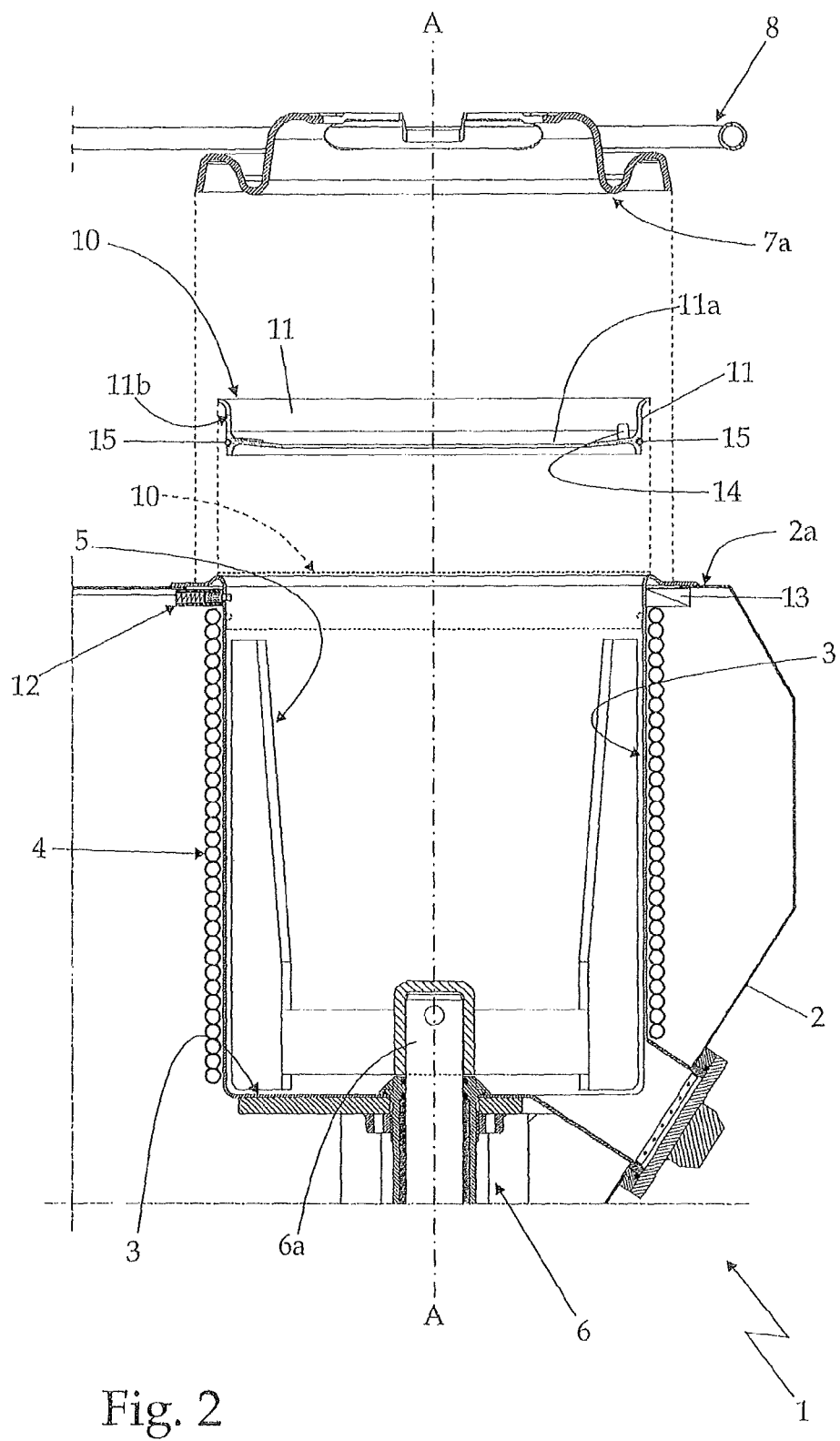
FIG. 2 is a side view of the machine shown in FIG. 1, with parts in section and parts removed for clarity.

With reference to FIGS. 1 and 2, numeral 1 indicates as a whole a machine for producing ice-cream and the like, and more specifically a batch freezer for production of handmade ice-cream.

Machine 1 essentially comprises outer, boxlike housing 2 which is rigid and preferably, though not necessarily, parallelepiped in shape; and a substantially cylindrical-shaped processing tub 3, which is suitable for collecting inside itself the various ingredients which are to be creamed for producing the desired amount of ice-cream, and which extends into the boxlike housing 2, from the upper wall 2a of the housing, while remaining coaxial to a substantially vertical reference axis A. Moreover, axis A is preferably, though not necessarily, locally substantially perpendicular to the outer surface of the upper wall 2a, so that the inlet of the processing tub 3 is defined by a substantially circular opening.

With reference to FIG. 2, machine 1 further comprises an inner cooling circuit 4 preferably, though not necessarily, of the heat-pump type, which is housed within boxlike housing 2, and is structured so as to be able to cool, on command, the processing tub 3 to bring and hold its content at a temperature lower than 0° C., and preferably ranging between −5° C. and −35° C.; and a mixing member 5, which is rotatably mounted within the processing tub 3 about a rotation axis preferably, though not necessarily, coinciding with the axis A of the tub, so as to be able to mix and uniformly blend the various ingredients which are poured into the tub during the creaming process for making the handmade ice-cream.

Mixing member 5 is further structured so as to be able to continuously scrape the inner cylindrical surface of the processing tub 3, and possibly also the bottom of the same tub, so as to prevent, during the creaming process, the high viscosity mixture formed within the processing tub 3 from stably adhering to the cylindrical side wall and to the bottom of the tub, due to the low temperature reached by the latter.

Machine 1 is further provided with a drive unit 6 which is housed within the boxlike housing 2, and is mechanically coupled to the mixing member 5 so as to be able to drive, on command, the mixing member into rotation about the axis A.

More specifically, drive unit 6 is preferably, though not necessarily, located immediately underneath the processing tub 3, and comprises an electric motor of known type (not shown) and a gear reduction unit provided with a rotating drive shaft 6a which extends through the bottom of the processing tub 3, and project into the processing tub 3 while remaining locally coaxial to axis A. The drive shaft 6a is driven into rotation by the electric motor, and the mixing member 5 is structured so as to be fixable in an easily removable manner onto the upper end of drive shaft 6a, coupling with the latter in an angularly integral manner.

Cooling circuit 4, mixing member 5 and drive unit 6 are components widely known in the field, and therefore will not be described in further detail.

Finally, with reference to FIGS. 1 and 2, machine 1 is provided with a manually operated, movable lid 7 which is able to completely close the inlet of the processing tub 3.

Unlike the currently known batch freezers, however movable lid 7 is defined by a cup-shaped body 7a substantially circular in shape, which is dimensioned so as to completely cover the inlet of the processing tub 3, and is manually displaceable by the operator between a closing position (see FIG. 1), in which the cup-shaped body 7a rests on the upper wall 2a of the boxlike housing 2, in an upside-down position, so as to completely cover the inlet of the processing tub 3; and an opening position in which the cup-shaped body 7a is located away from the inlet of the processing tub 3 so as to allow free access to the processing tub 3.

More specifically, in the example shown, cup-shaped body 7a is preferably, though not necessarily, made of plastic material and preferably, though not necessarily, has a modular structure.

With reference to FIG. 1, moreover, in the example shown cup-shaped body 7a is cantileverly fixed to the central length of a supporting arm 8 which, in turn, is hinged to the upper wall 2a of the boxlike housing 2 at one end, so as to be able to freely rotate about a substantially horizontal articulation axis B, between a completely lowered position in which arm 8 rests in a substantially horizontal position, astride of the inlet of the processing tub 3 (see FIG. 1); and a raised position in which the arm stands in a substantially vertical position, cantileverly from the upper wall 2a of the boxlike housing 2.

Obviously, cup-shaped body 7a is fixed cantileverly and upside down to the supporting arm 8, so as to be arranged, when arm 8 is in the lowered position, with the peripheral rim in abutment against the surface of the upper wall 2a of the boxlike housing 2, thus completely surrounding the inlet of the processing tub 3 so as to completely cover the processing tub 3.

In other words, cup-shaped body 7a is fixed to the upper wall 2a of the boxlike housing 2 so as to be able to rotate about the axis B between a closing position (see FIG. 1) in which the cup-shaped body 7a rests on the upper wall 2a, in an upside down position, and completely covers the inlet to the processing tub 3; and an opening position in which the cup-shaped body 7a is raised to a predetermined height from the upper wall 2a so as to allow free access to the processing tub 3.

Finally, with reference to FIGS. 1 and 2, machine 1 is also provided with an annular, removable containing collar 10, which is preferably, though not necessarily, made of plastic material and is dimensioned so as to be fitted in a stable, but easily releasable manner, at the inlet of the processing tub 3, above mixing member 5. The containing collar 10 is structured so as to retain, within the processing tub 3, the high viscosity mixture which is formed within the tub during the final steps of the creaming process, and which the mixing member 5, by rotating about axis B, tends to push upwards, along the cylindrical side wall of the tub, out of the processing tub 3 by lifting movable lid 7.

In the example shown, in particular, containing collar 10 comprises preferably, though not necessarily, a cylindrical sleeve 11 which is dimensioned so as to be forced into the inlet of the processing tub 3, and is internally provided with a projecting annular flange 11a which protrudes from the inner cylindrical surface of the sleeve, perpendicular to the longitudinal axis of the latter (which longitudinal axis coincides with axis A of processing tub 3 when sleeve 11 engages the inlet of processing tub 3).

Moreover, machine 1 is preferably, though not necessarily, provided with a collar locking device, which is structured so to able to retain the containing collar 10 stably in place within the inlet of processing tub 3.

More specifically, in the example shown, the collar locking device comprises a number of retractable pins 12 fixed to the cylindrical side wall of processing tub 3, angularly and equally spaced about the axis A at the inlet of the tub. Each retractable pin 12 is adapted to engage a corresponding indent or through opening 11b realized on sleeve 11, so as to be able to hook and stably constrain the containing collar 10 to the processing tub 3.

Figure 3:
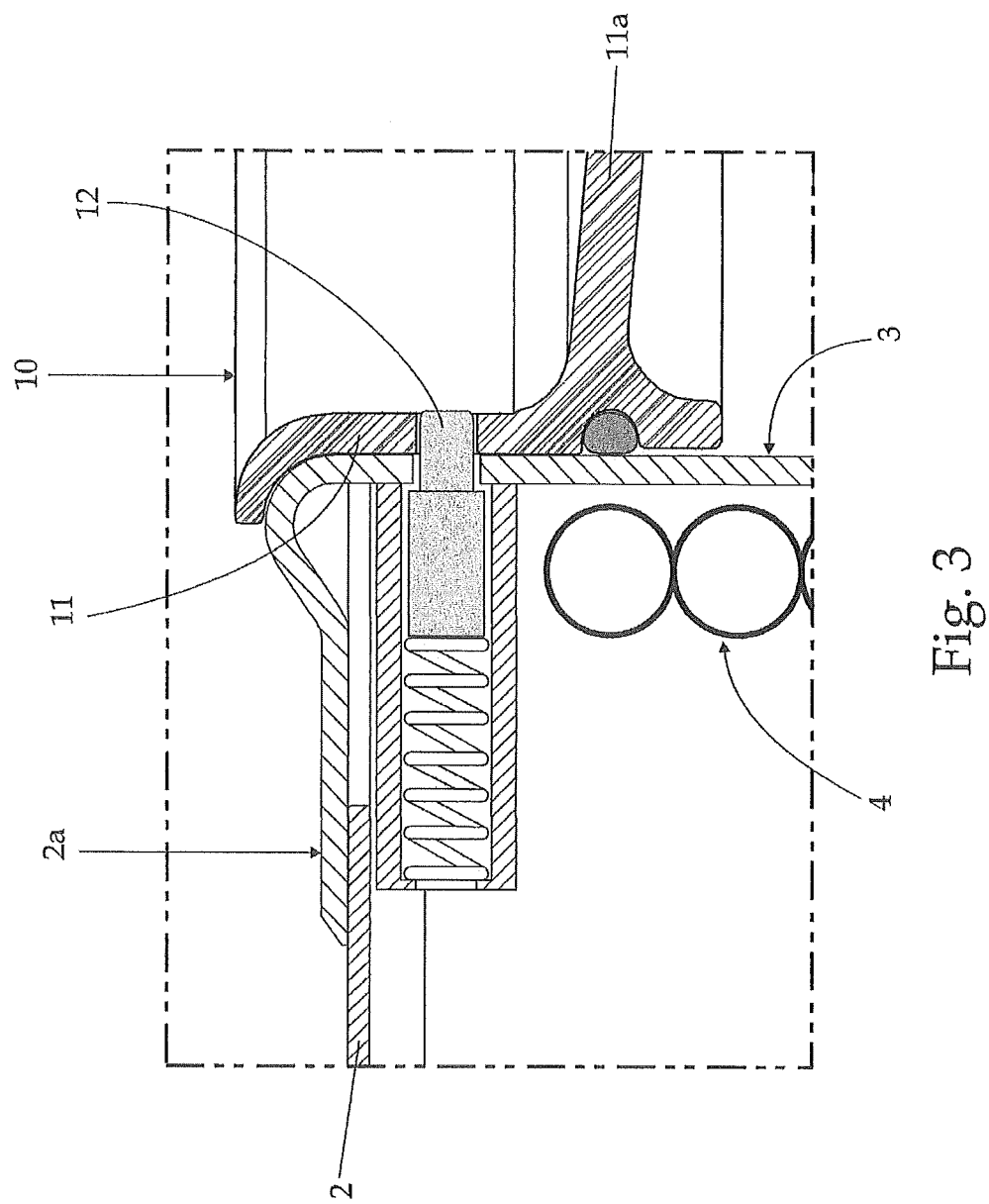
FIG. 3 is an enlarged view of a portion of the machine of FIG. 2.

More specifically, with reference to FIG. 2, in the example shown each retractable pin 12 is fixed to the cylindrical side wall of processing tub 3, at the inlet of the tub, so as to be able to axially move in a direction which is locally substantially perpendicular to the side wall of the tub, between an extracted position (see FIG. 1) in which the retractable pin 12 protrudes into the tub and may engage the through opening 11b of sleeve 11; and a retracted position in which the retractable pin 12 does not protrude into the processing tub 3, as illustrated in FIGS. 3 and 4 respectively. The retractable pin 12 is kept in the extracted position by a pre-compressed coil spring or similar elastic element.

Alternatively, the collar locking device may comprise a single locking pin, which is firmly fixed to the cylindrical side wall of processing tub 3, at the inlet, and stably protrudes into the processing tub 3 so as to be able to engage a corresponding indent or through opening 11b present on sleeve 11.

In addition to the above, machine 1 may possibly comprise also one or more presence sensors 13 (e.g. contact or magnetic-type sensors) capable of detecting when the containing collar 10 engages the inlet of the processing tub 3, and/or capable of detecting when the cup-shaped body 7a rests on the upper wall 2a of the boxlike housing 2, to cover the inlet of processing tub 3.

Obviously, if magnetic-type presence sensors are used, the containing collar 10 and/or the cup-shaped body 7 will be provided with at least one permanent magnet 14 capable to generate a magnetic field detectable by the presence sensor 13.

If machine 1 is provided with the presence sensors 13, the electronic control unit (not shown) of machine 1 may be configured so as to allow activation of the electric motor only when the presence sensor(s) 13 report that containing collar 10 and/or cup-shaped body 7 are in the intended position for the safe operation of the batch freezer.

Finally, with reference to FIG. 2, containing collar 10 is preferably, though not necessarily, also provided with an annular seal 15 which is housed within an annular groove realized on the outer periphery of the sleeve 11.

Operation of machine 1 can be easily inferred from the above description, and no further explanations are required.

Advantages resulting from the presence of containing collar 10 are large in number. First, the presence of containing collar 10 allows to lighten and simplify the structure of the movable lid 7 which closes processing tub 3, to achieve a simple and cost-effective cup-shaped body 7 made of plastic material, which may be retained in the closing position even only by gravity.

In fact, movable lid 7 now serves only for covering the inlet of the processing tub 3 so as to prevent something undesired/inappropriate from accidentally falling into the tub.

Furthermore, separation of the functions between the containing collar 10 and the movable lid or cup-shaped body 7a allows to realize components which are structurally more cheap to be produced, with all the resulting advantages on the machine production costs.

Clearly, changes may be made to the machine 1 for producing ice-cream and the like as described herein without, however, departing from the scope of the present invention.

For example, in a non-shown constructional variation magnetic-type presence sensor(s) 13 may be located within the fixed or retractable locking pins 12. In this case, the permanent magnet(s) 14 are located on the containing collar 10, close to the indents or through openings 11b realized on sleeve 11.

The invention claimed is:

1. A machine comprising:
    a housing;
    a cylindrical-shaped processing tub that extends within the housing, from an upper wall thereof, remaining coaxial to a reference axis;
    means for cooling the processing tub so as to bring and hold the contents thereof at a temperature lower than 0° C.; and
    a mixing member rotatably mounted within the processing tub about a rotation axis substantially coinciding with the reference axis;
    the mixing member being fixed onto the upper end of a drive shaft that projects into the processing tub through the bottom of the processing tub, and being structured to mix ingredients within the processing tub and to scrape at least an inner surface of the processing tub to prevent the ingredients from adhering to a side wall of the tub; and
    an annular containing collar which is dimensioned so as to be fitted in a-releasable manner in the processing tub above the mixing member, and structured so as to retain within the processing tub the ingredients that the mixing member tends to push upwards, along the side wall of the tub, wherein the containing collar comprises a cylindrical sleeve which is dimensioned so as to be forced into the inlet of the processing tub, and is internally provided with a protruding annular flange that protrudes from the inner surface of the sleeve towards the centre of the sleeve.

2. The machine according to claim 1, further comprising collar locking means for holding the containing collar in place within the processing tub.

3. The machine according to claim 1, wherein the containing collar is made of plastic material.

4. The machine according to claim 1, wherein the cooling means are able to cool the processing tub so as to bring and hold the content thereof at a temperature ranging between −5° C. and −35° C.

5. The machine according to claim 1, further comprising a presence sensor capable of detecting when the containing collar engages the inlet of said processing tub.

6. The machine according to claim 1, further comprising a drive unit which is mechanically coupled to the mixing member so as to be able to drive the mixing member into rotation about its rotation axis; the drive unit being located underneath the processing tub, and comprising an electric motor coupled to the drive shaft.

7. The machine according to claim 1, further comprising an annular seal positioned within a groove in an outer periphery of the sleeve.

8. The machine according to claim 1, wherein the flange protrudes in a direction perpendicular to the reference axis.

9. The machine according to claim 1, further comprising a displaceable lid which is able to close the inlet of the processing tub; said displaceable lid including a body which is dimensioned so as to completely cover the inlet of the processing tub, and is manually displaceable by the operator between a closed position in which the body rests on an upper wall of the boxlike housing, so as to completely cover the inlet of the processing tub; and an opening position in which the body is positioned away from the inlet of the processing tub so as to allow free access to the processing tub.

10. The machine according to claim 9, wherein the body is made of a plastic material.

11. The machine according to claim 9, wherein the body is cantileverly attached on a supporting arm which, in turn, is hinged on the upper wall of the housing so as to be able to move between a completely lowered position in which said arm rests, in a substantially horizontal position, astride of the inlet of the processing tub; and a raised position in which said arm stands in a substantially vertical position, cantileverly from the upper wall of said housing.

12. The machine according to claim 9, further comprising at least one presence sensor that can detect when the body rests on the upper wall of the boxlike housing to cover the inlet of said processing tub.

13. A machine comprising:
    a housing;
    a cylindrical-shaped processing tub that extends within the housing, from an upper wall thereof, remaining coaxial to a reference axis;
    means for cooling the processing tub so as to bring and hold the contents thereof at a temperature lower than 0° C.;
    a mixing member rotatably mounted within the processing tub about a rotation axis substantially coinciding with the reference axis;
    the mixing member being fixed onto the upper end of a drive shaft that projects into the processing tub through the bottom of the processing tub, and being structured to mix ingredients within the processing tub and to scrape at least an inner surface of the processing tub to prevent the ingredients from adhering to a side wall of the tub; and an annular containing collar which is dimensioned so as to be fitted in a-releasable manner in the processing tub above the mixing member, and structured so as to retain within the processing tub the ingredients that the mixing member tends to push upwards, along the side wall of the tub; and collar locking means for holding the containing collar in place within the processing tub;
wherein the collar locking means comprise at least one pin which is attached to the side wall of the processing tub at an inlet of the processing tub, and can protrude within the processing tub to engage the containing collar.

14. The machine according to claim 13, wherein the cylindrical sleeve is provided with at least one recess or side opening, and the pin is able to engage said recess or side opening.

15. The machine according to claim 14, wherein the collar locking means comprise a number of pins attached to the side wall of the processing tub, angularly distributed about the reference axis of the tub; each of said pins is a retractable pin movable to protrude within the processing tub for engaging the containing collar.

\* \* \* \* \*